US006553623B2

(12) United States Patent
Long

(10) Patent No.: US 6,553,623 B2
(45) Date of Patent: Apr. 29, 2003

(54) AUTOMATIC PIVOT DOOR OPENER

(76) Inventor: Michael W. Long, 1030 Capistrano Ct., San Luis Obispo, CA (US) 93405

( * ) Notice: Subject to any disclaimer, the term of this patent is extended or adjusted under 35 U.S.C. 154(b) by 0 days.

(21) Appl. No.: 09/818,698

(22) Filed: Mar. 27, 2001

(65) Prior Publication Data

US 2002/0138945 A1 Oct. 3, 2002

(51) Int. Cl.[7] .............................. E05F 1/14; F16F 1/06
(52) U.S. Cl. .......................................... 16/285; 267/155
(58) Field of Search .......................... 16/277, 285, 280, 16/295, 376, 375, 50, 68, 72; 267/155, 275

(56) References Cited

U.S. PATENT DOCUMENTS

| | | | | | |
|---|---|---|---|---|---|
| 1,215,498 | A | * | 2/1917 | Dietz | 16/307 |
| 1,344,538 | A | | 6/1920 | Kaufman | |
| 1,715,590 | A | | 6/1929 | Burhenne | |
| 1,925,945 | A | * | 9/1933 | Zielinski et al. | 16/76 |
| 2,733,476 | A | | 2/1956 | Eck | |
| 2,807,043 | A | * | 9/1957 | Gordon | 16/307 |
| 2,853,924 | A | | 9/1958 | Herzfeld et al. | |
| 2,967,325 | A | | 1/1961 | Herzfeld | |
| 3,098,258 | A | | 7/1963 | Ruiz | |
| 3,106,010 | A | | 10/1963 | Morrell | |
| 3,329,991 | A | | 7/1967 | Gobble | |
| 3,538,538 | A | | 11/1970 | Field | |
| 3,737,182 | A | * | 6/1973 | Sharpe | 403/187 |
| 3,836,223 | A | * | 9/1974 | Signore | 312/334.14 |
| 4,193,164 | A | | 3/1980 | Okayama | |
| 4,491,204 | A | * | 1/1985 | Dirauf et al. | 116/208 |
| 4,537,452 | A | * | 8/1985 | Rice et al. | 312/282 |
| 4,788,748 | A | | 12/1988 | Bizek | |
| 4,823,438 | A | | 4/1989 | Roloff | |
| 5,041,818 | A | * | 8/1991 | Liu | 16/306 |
| 5,191,678 | A | | 3/1993 | Firari | |
| 5,320,333 | A | * | 6/1994 | Koch | 15/250.34 |
| 5,533,234 | A | | 7/1996 | Bizek | |
| 5,649,339 | A | * | 7/1997 | Reed | 16/50 |
| 5,826,306 | A | * | 10/1998 | Faubert et al. | 16/244 |
| 6,205,618 | B1 | * | 3/2001 | Lee | 16/256 |

* cited by examiner

*Primary Examiner*—Anthony Knight
*Assistant Examiner*—Vishal Patel
(74) *Attorney, Agent, or Firm*—Knobbe, Martens, Olson & Bear LLP

(57) ABSTRACT

A spring door opener comprising for a helical torsion spring coil body with two legs extending therefrom. One of the legs contains two substantially 90-degree bends such that the legs are configured to exit the coil body on the same side. The door opener is attached to the hinge pin on a door hinge to maintain a door in an open position.

12 Claims, 6 Drawing Sheets

AUTOMATIC PIVOT DOOR OPENER

BACKGROUND OF THE INVENTION

1. Field of the Invention

This invention relates generally to a means for opening unlatched doors and more particularly to a self-actuating door opener 2. Description of the Related Art A very common, albeit relatively minor, nuisance associated with many residential buildings is the result of a door which hangs out-of-plumb. Doors can become out-of-plumb due to improper installation or simply the natural shifting of a building over time. Because of gravity, some doors in this condition will not stay open, but rather will tend to swing towards either the closed position or partially closed position. Typically, the operator of a door either wants it fully closed or fully open, but not in-between. Consequently, minor frustration often results when an unlatched out-of-plumb door requires either the use of some sort of door stop or the irritating acceptance of having a door which constantly remains only partially open or sometimes even completely closed (but not latched). This problem may also have other noticeable adverse consequences. For example, some situations require the periodic observation between rooms to monitor children or disabled persons. Additionally, in some situations, ambient ventilation is desired, e.g., in bathrooms or kitchens. In these situations, an unwanted partially closed or completely closed door could become more troubling than merely having a few aesthetic imbalances in the hallway.

Although a variety of doorstops are readily available, they can be somewhat inconvenient to install. Common doorstops require bending over at the waist to apply and remove them, and then afterwards stowing them away from small children and pets when not being used so that they do not get lost. Frequently, the nuisance of this routine causes the operator to either forget or ignore the practice, thereby inviting again the problem of the out-of-plumb door.

Additionally, there are door openers that require a special hinge. A fair amount of time and effort must be expended to replace an existing hinge on the door with the new special hinge to achieve the desired results.

What is desired is a device with a simple one-piece design that can be attached to an existing door hinge pin that automatically maintains either a left-hand or right-hand swing door in the open position without impeding operation of the door. Also, it is desired to have a door opener that can be installed quickly and without the need of special tools or special mounting hardware, and can be manufactured and sold economically. Additionally, it is desired to have a device that can be used in tandem, such as one spring per hinge on two or more hinges within the same door, for increased force.

It is also desired to have a device that utilizes a constant pre-load or partial deflection of the coil to maintain the minimum static tension necessary to actually hold the door open to its desired angle. It is conceivable that some applications may in fact desire the resultant door angle to remain partially open instead of fully open.

It is also desired to have a device that mounts on the door hinge in such a way that it will closely follow the profile of the mating door surfaces and the door hinge, thereby resulting an a relatively undetectable device during normal operations.

SUMMARY OF THE INVENTION

A door opener according to the invention includes a helical spring having a pair of legs extending therefrom for engagement with a door and a door frame. One of the legs includes two substantially 90 degree bends such that both legs extend from a first side of the helical spring. Each leg can further include a bend generally midway between the helical spring and a distal end of the leg. Advantageously, the distal end of each leg is substantially straight.

The helical spring can be used with a door hinge including a pair of plates and a hinge pin engaging the hinge plates, wherein the hinge pin includes a hinge engaging portion and a top cap such that the helical spring is positioned around the hinge pin engaging portion so that the legs rest on a top edge of the hinge plates.

In one embodiment, the door opener can be used with a removable safety sleeve, the sleeve configured to be placed over the top cap and helical spring such that the legs are positioned in a groove of said sleeve to maintain the helical spring in a torsional engagement position.

In another embodiment, the door opener can be used with a removable safety hook, the hook including a hole for receiving a first of the pair of legs, and including a channel for receiving a second leg of the pair of legs such that the legs are constrained by the hook to maintain the helical spring in a torsional engagement position.

The invention also includes a method for urging a door into an open position, including removing a hinge pin from a hinge of a door, placing a coil spring over the removed hinge pin, wherein the coil spring has two legs extending radially outward from the hinge pin, and biasing the door into an open position by means of torsional force applied to the door from the coil spring through one of the two legs. In one embodiment, the step of placing the coil spring over the removed hinge pin further includes the step of holding the two legs together by placing a sleeve over the coil spring, wherein the sleeve has a slot into which the two legs are inserted. In another embodiment, the step of placing the coil spring over the removed hinge pin further includes the step of holding the two legs together by placing one leg in a hole in a hook and the second leg in a channel in the hook.

BRIEF DESCRIPTION OF THE DRAWINGS

These and other objects and features of the invention will become more fully apparent from the following description and appended claims taken in conjunction with the following drawings:

DETAILED DESCRIPTION OF THE INVENTION

The following presents a detailed description of certain specific embodiments of the invention. However, the invention can be embodied in a multitude of different ways as defined and covered by the claims. In this description, reference is made to the drawings wherein like parts are designated with like numerals throughout.

Figure 1:
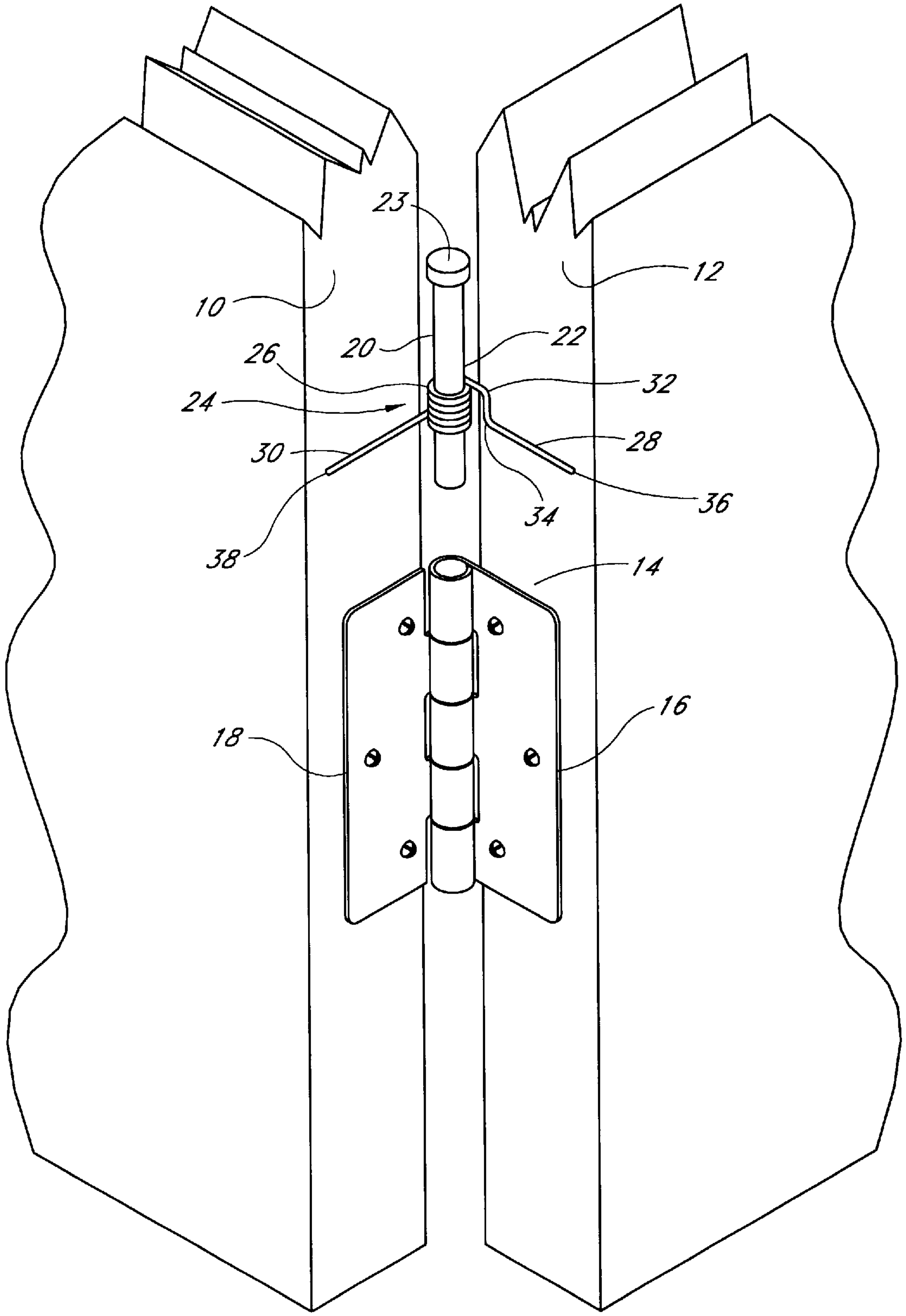
FIG. 1 is a front elevation view of a door opener according to the invention included as part of a conventional hinge.

FIG. 1 illustrates a left-hand door 10 hung in a door frame 12, the hinging means being a hinge 14 of known construction. Alternatively, a right-hand door 10 may be hung in a door frame 12. The hinge 14 has hinge plates 16 and 18 secured to the door frame 12 and door 10 respectively. Hinge pin 20 engages the hinge plates 16 and 18. The hinge pin 20 consists of the hinge engaging portion 22 and a top cap 23 of larger diameter than the hinge engaging portion 22.

A door opener 24 according to the invention includes a helical torsion spring coil body 26. The coil body 26 has a diameter which is smaller than the top cap 23 but larger than the hinge engaging portion 22 of the hinge pin 20. The door opener 24 is preferably made of music wire, stainless steel or other spring steel. The diameter of the wire in the helical torsion spring may vary depending upon the required force needed for different types and sizes of doors, e.g., hollow-core wood, solid-core wood, large width/height, etc. Thus, it will be appreciated that the hinge pin 20 of a conventional door hinge 14 may be removed, the hinge engaging portion 22 passed through the coil body 26, and then the hinge pin 20 returned to the door hinge 14 to mount the door opener 24 on the hinge 14.

The door opener 24 has legs 28 and 30 extending out from the coil body 26, and in one embodiment generally in either direction from the coil body 26. Leg 28 bears against the door frame 12 and leg 30 bears against the door 10. In operation, closing of the door 10 will move leg 30 of the door opener 24 closer to leg 28 to increase the torsional force exerted by the coil body 26 and transmitted through the leg 30 to the door 10, so that when door 10 is closed, the door opener 24 will operate to urge the door 10 toward the open position.

Leg 28 has two substantially 90 degree bends 32 and 34 close to the coil body 26 to allow both legs 28 and 30 to exit on the bottom side of the coil body 26. This allows the legs 28 and 30 to rest along the top edge of the door hinge 14, making the door opener 24 less obtrusive. It will be appreciated however, that other configurations of the legs 28 and 30 can be used, including configurations in which at least a distal portion of the legs 28 and 30 extends downward over the hinge plates 16 and 18, or upward along the door 10 and the door frame 12. Note that the legs 28 and 30 will torsionally engage the door 10 and door frame 12, either directly (by being in physical contact) or indirectly (e.g., by pressing against the hinge plates 16, 18).

The distal ends 36 and 38 of legs 28 and 30 respectively may advantageously be straight. This allows the legs 28 and 30 to nestle in the crevice between the door hinge 14 and the door 10 and door frame 12 for maximum stability and effectiveness during device operation.

Figure 2:
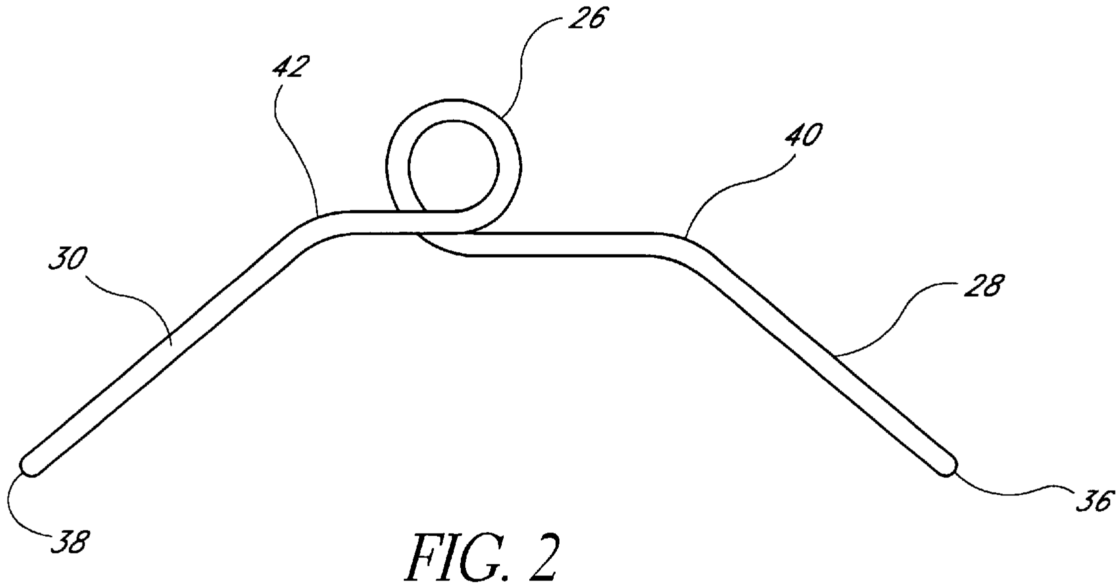
FIG. 2 is a top elevation view of the door opener of FIG. 1.

FIG. 2 illustrates an embodiment in which the legs 28 and 30 have a bend 40 and 42 respectively substantially midway between the coil body 26 and the distal ends 36 and 38. This allows the door opener 24 to lie flush against the door 10 and the door frame 12 by accommodating the normal door angles involved, thereby further making the door opener 24 less obtrusive.

Figure 3:
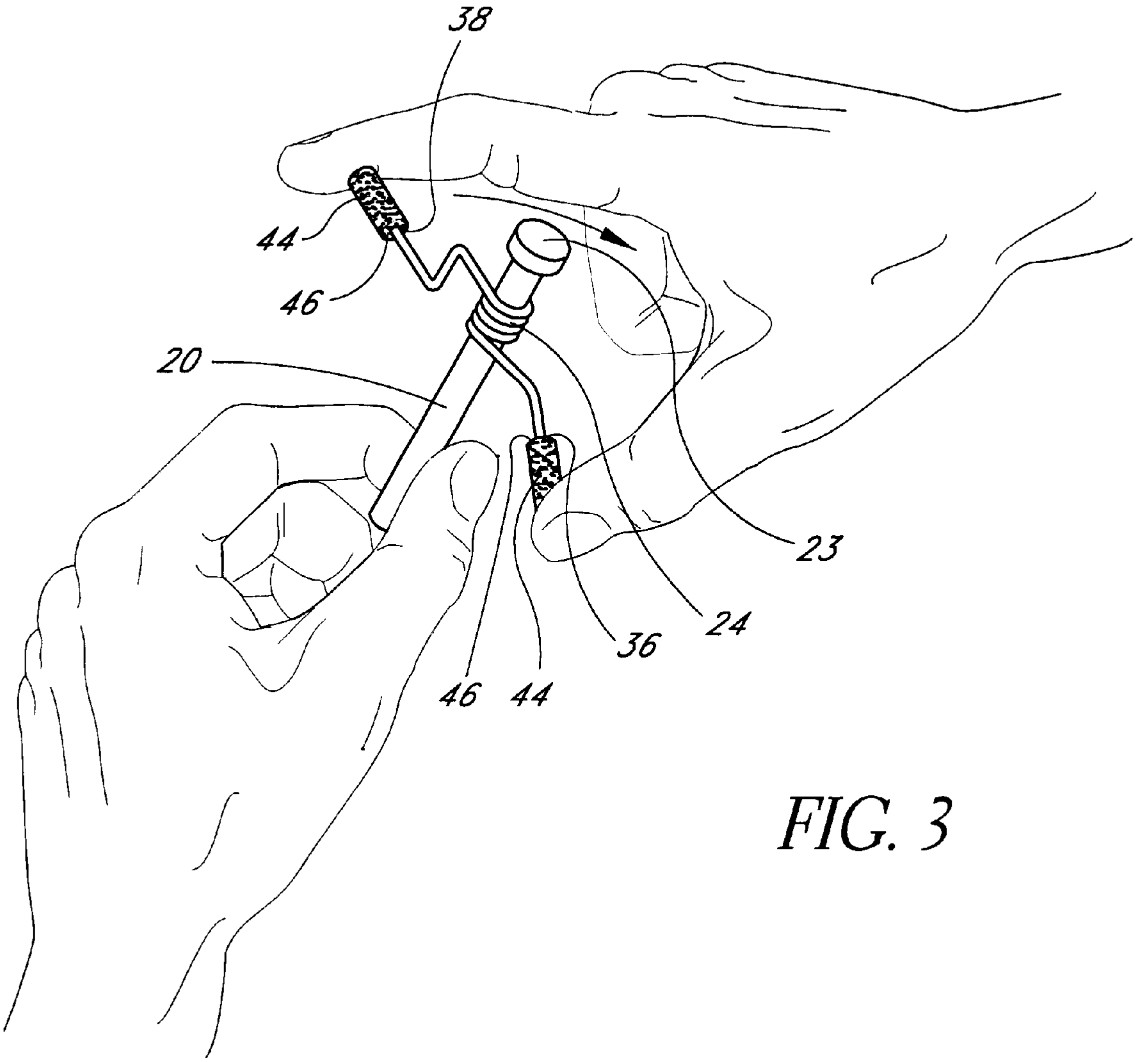
FIG. 3 is a perspective view of the door opener of FIG. 1 with point pads.

FIG. 3 illustrates a user grasping the hinge pin 20 and door opener 24. A protective point pad 44 is removably attached to each of the distal ends 38 and 40 of legs 28 and 30 respectively to cushion the sharp distal ends 38 and 40. Point pad 44 is a cylindrical member made of a rubber material. Alternatively, point pads 44 may be rectangular or other suitable shape and made of plastic, wood or other suitable material. The distal end 38, 40 is pushed into a first end 46 of point pad 44 so as to cover the distal end 38 or 40 to prevent a poking injury to the user.

Figure 4:
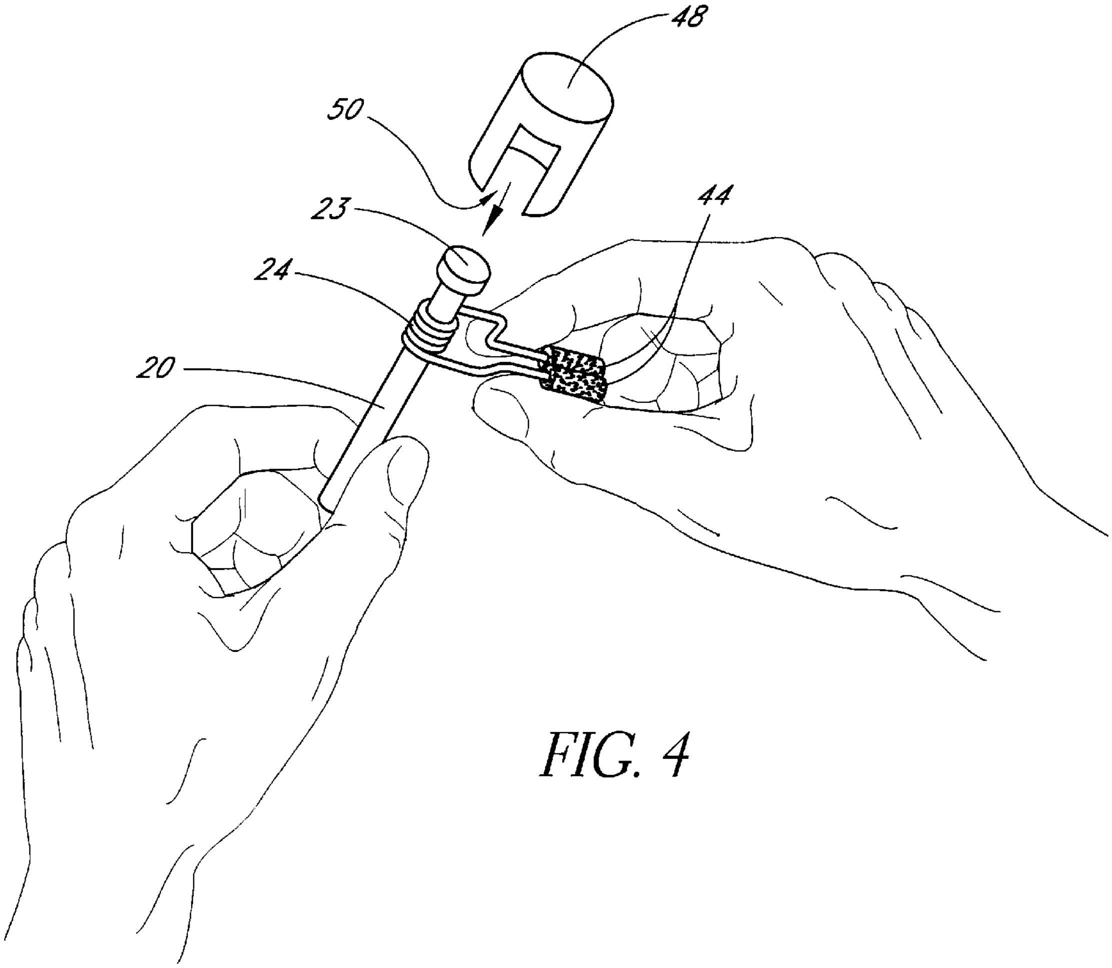
FIG. 4 is a perspective view of the door opener of FIG. 1 with a safety sleeve.

FIG. 4 illustrates a user grasping the hinge pin 20 and door opener 24 and holding the legs 28 and 30 in a biased position ready for installation of the hinge pin 20 and door opener 24 in the hinge 14 (not shown). In this embodiment, safety sleeve 48 is inserted over the door opener 24 such that the legs 28 and 30 are positioned within a groove 50 in the safety sleeve 48. The safety sleeve 48 maintains the door opener 24 in the biased position while the user installs the hinge pin 20 and door opener 24 in the hinge 14. After installation, safety sleeve 48 can be removed, allowing the legs 28 and 30 to contact the door 10 and door frame 12 as described above.

Figure 5:
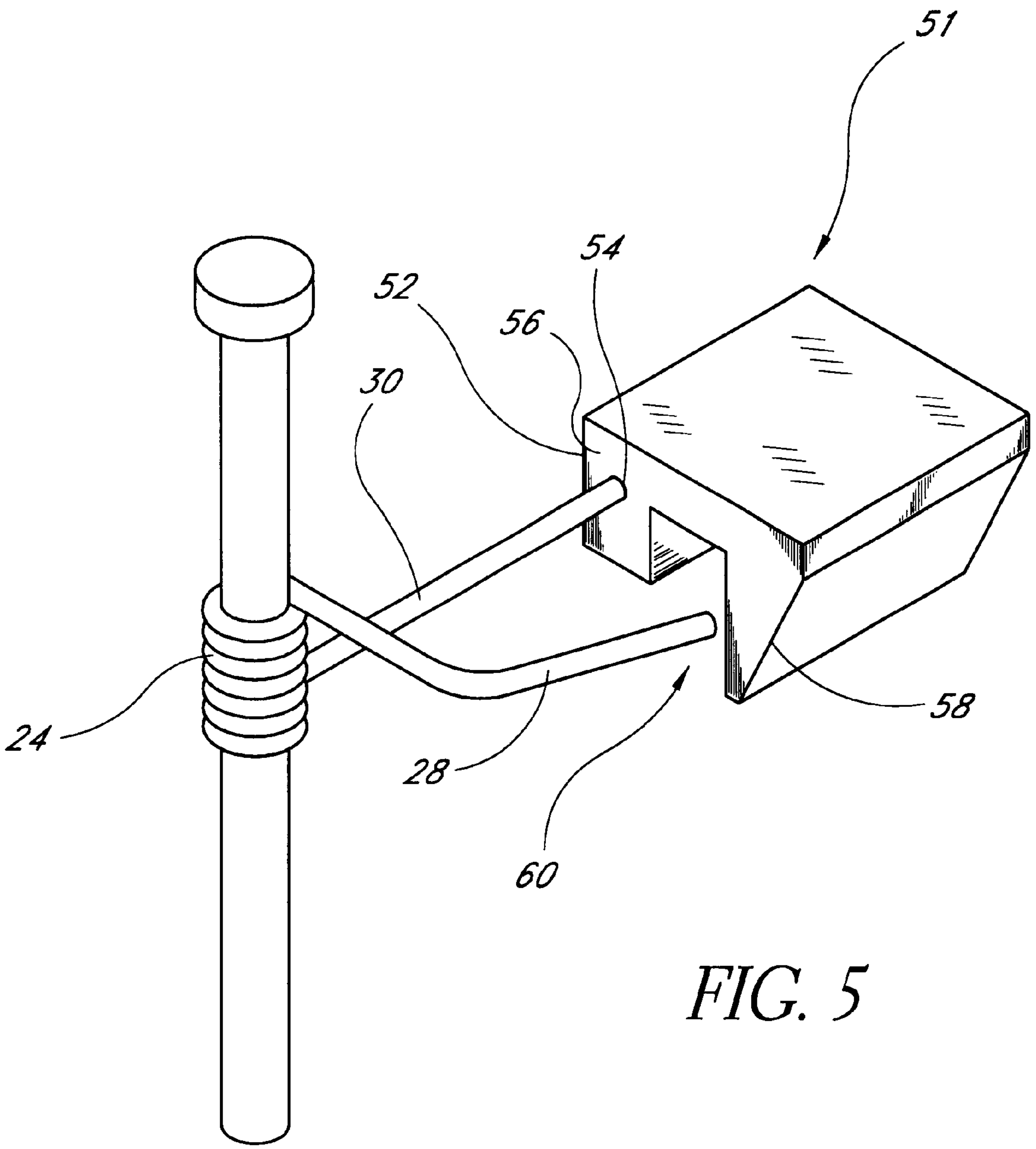
FIG. 5 is a perspective view of a safety hook that can be used when installing the door opener of FIG. 1.

FIG. 5 illustrates an embodiment of a safety hook 51 that can be used as an alternate installation aid in installing the door opener 24. The safety hook contains a first end portion 52 with a hole 54 formed in a first face 56 of the end portion 52. The hole 54 can run through a portion or the entire length of the end portion 52. The safety hook 51 also contains a second end portion 58 configured such that a channel 60 is formed in the safety hook 51 between the first end portion 52 and the second end portion 54 running substantially the length of the safety hook 51. During installation of the door opener 24, either leg 28 or 30 is inserted into the hole 54. The legs 28 and 30 are pinched together such that the free leg 30 or 28 is positioned within the channel 60 in the safety hook 51. Safety hook 51 maintains the door opener 24 in the biased position while the user installs the hinge pin 20 and door opener 24 in the hinge 14. After installation, safety hook 51 can be removed, allowing the legs 28 and 30 to contact the door 10 and door frame 12 as described above.

Figure 6:
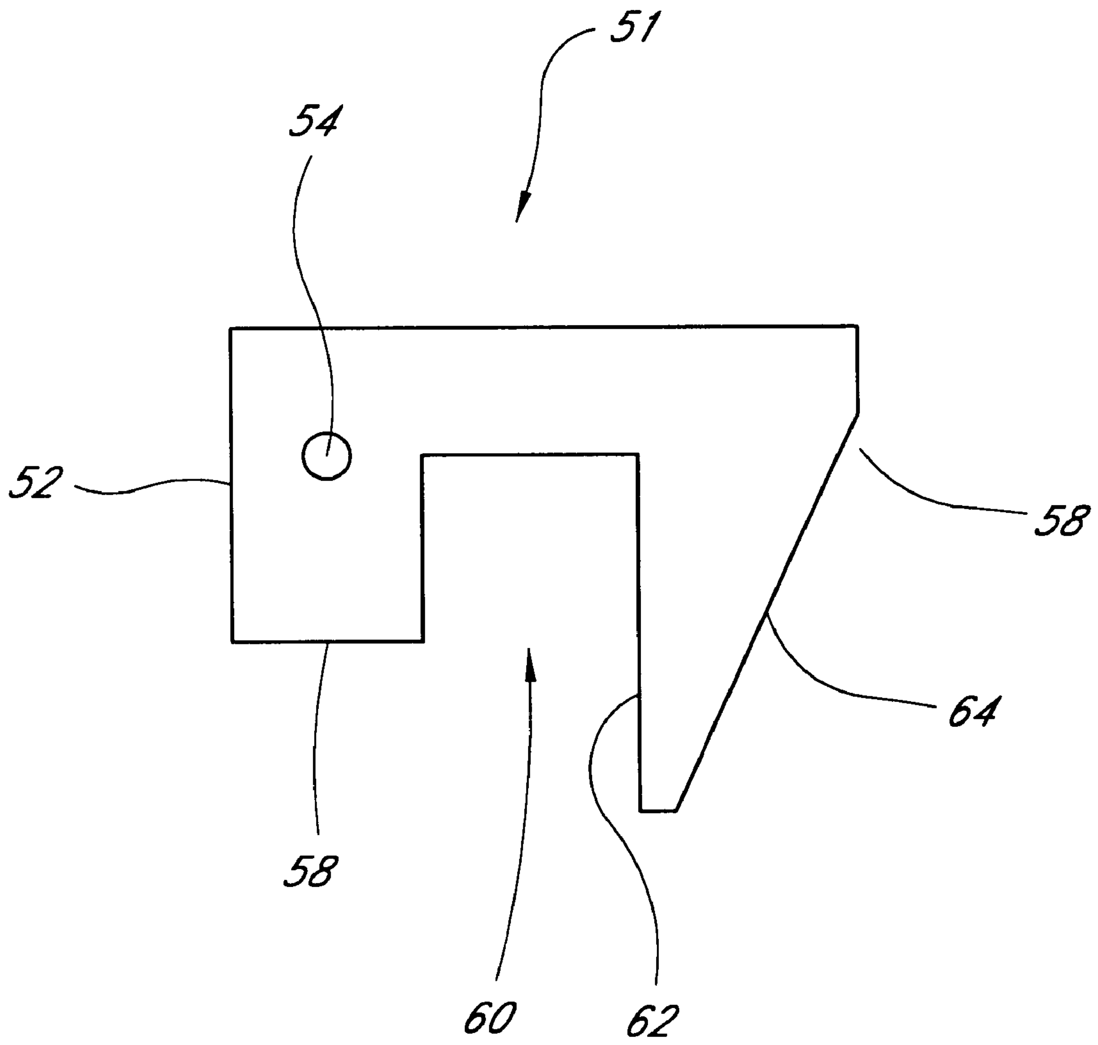
FIG. 6 is a side view of the safety hook of FIG. 5.

FIG. 6 is an end view of the safety hook 51 illustrating that a first face 62 of the channel 60 is advantageously inclined at an angle, such as 15 degrees, to reduce the change of the stressed leg from escaping the hook. Outer edge 64 of the second end portion 54 is advantageously sloped and longer than the first end portion 52 to facilitate insertion of the leg into the channel 60.

Specific devices and functions have been set forth. However, a skilled technologist will realize that there are many ways to partition the system of the present invention, and that there are many parts, components or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A door opening system comprising:

a door binge comprising a pair of hinge plates and a hinge pin engaging said pair of hinge plates, wherein said hinge pin comprises a hinge engaging portion and a top cap;

a helical spring removably positioned around the binge pin engaging portion, said helical spring having a pair of legs extending therefrom for torsional engagement with a door and a door frame, said legs configured to rest above a top edge of the hinge plates, wherein one of said pair of legs includes a first bend configured to position a portion of the leg adjacent to the coil body of the helical spring and a second bend configured to extend a distal end of the leg outward from the coil body such tat both legs extend outwardly from the coil body of said helical spring; and a residential door attached to said door hinge, which door has a tendency to drift closed in the absence of said helical spring, wherein said helical spring biases said door toward an open position.

2. The door opening system of claim 1, wherein the legs are configured to rest on the top edge of the hinge plates.

3. The system of claim 1, further comprising a removable sleeve, said sleeve configured to be placed over the top cap and helical spring such that the legs are positioned in a groove of said sleeve to maintain the helical spring in a torsional engagement position.

4. The system of claim 1, further comprising a removable hook, said hook including a hole for receiving a first of the pair of legs, and including a channel for receiving a second leg of the pair of legs such that the legs are constrained by the hook to maintain the helical spring in a torsional engagement position.

5. The system of claim 1, further comprising at least one pad configured to engage an end of one of the legs.

6. The door opening system of claim 1, wherein one of the pair of legs includes two substantially 90 degree bends such that both legs extend from a first side of said helical spring.

7. The door opening system of claim 6, wherein each leg further includes a bend generally midway between the helical spring and a distal end of the leg.

8. The door opening system 7, wherein the distal end of each leg is substantially straight.

9. A door opening system comprising:

a residential door frame and door including a door binge comprising a pair of plates and a hinge pin engaging said binge plates, wherein said hinge pin comprises a hinge engaging portion and atop cap; and a helical spring positioned around the binge pin engaging portion, said helical spring having a pair of legs extending therefrom for torsional engagement with a door and a door frame, said legs configured to rest adjacent to a top edge of the hinge plates for torsionally engaging the door and the door frame and exerting a force opposing a tendency of the door to drift closed to maintain said door in a resting open position.

10. A method for urging a door into an open position, comprising:

removing a binge pin from a hinge of a residential door that has a tendency to drift closed;

placing a coil spring over the removed hinge pin, wherein the coil spring has two legs extending radially outward from the hinge pin, one of said legs configured to apply torsional force to the door and the other of said legs configured to apply an opposing torsional force to a door frame, to bias the door away from the frame;

replacing the hinge pin in the hinge of a door; and biasing the door into an open position by means of torsional force applied to the door from the coil spring through at least one of the two legs.

11. The method of claim 10, wherein the step of placing the coil spring over the removed hinge pin further includes the step of holding the two legs together by placing a sleeve over the coil spring, wherein the sleeve has a slot into which the two legs are inserted.

12. The method of claim 10, wherein the step of placing the coil spring over the removed hinge pin further includes the step of holding the two legs together with a hook by placing a first leg of the two legs in a hole in the hook, and placing the second leg of the two legs in a channel in the hook.

* * * * *